US008583889B2

(12) United States Patent
Jennas, II et al.

(10) Patent No.: US 8,583,889 B2
(45) Date of Patent: *Nov. 12, 2013

(54) SYNCHRONOUS EXTENT MIGRATION PROTOCOL FOR PAIRED STORAGE

(75) Inventors: Paul A. Jennas, II, Tucson, AZ (US);
Larry Juarez, Tucson, AZ (US); David Montgomery, Costa Mesa, CA (US);
Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/970,830

(22) Filed: Dec. 16, 2010

(65) Prior Publication Data

US 2012/0159096 A1  Jun. 21, 2012

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl.
USPC .......................... 711/165; 711/161; 707/610

(58) Field of Classification Search
USPC ................. 711/161–162, 165; 707/610, 617
See application file for complete search history.

(56) References Cited

U.S. PATENT DOCUMENTS

| 5,313,631 | A | 5/1994 | Kao |
| 6,442,601 | B1 | 8/2002 | Gampper et al. |
| 6,463,513 | B1 | 10/2002 | Bish et al. |
| 6,502,205 | B1 * | 12/2002 | Yanai et al. ................... 714/6.32 |
| 7,007,135 | B2 | 2/2006 | Koo et al. |
| 7,165,158 | B1 | 1/2007 | Yagawa |
| 7,320,058 | B2 | 1/2008 | Fujibayashi et al. |
| 7,330,948 | B2 | 2/2008 | Deguchi et al. |
| 7,650,477 | B2 * | 1/2010 | Deguchi et al. ............... 711/162 |
| 2002/0194431 | A1 | 12/2002 | Koo et al. |
| 2007/0239803 | A1 * | 10/2007 | Mimatsu ........................ 707/204 |
| 2008/0154913 | A1 * | 6/2008 | Kohonen ......................... 707/10 |
| 2009/0300079 | A1 * | 12/2009 | Shitomi ........................ 707/204 |
| 2010/0274826 | A1 * | 10/2010 | Takata et al. .................. 707/812 |
| 2011/0072225 | A1 * | 3/2011 | Kawaguchi et al. .......... 711/162 |
| 2012/0079224 | A1 * | 3/2012 | Clayton et al. ................ 711/162 |
| 2012/0159097 | A1 | 6/2012 | Jennas, II et al. |
| 2012/0260052 | A1 | 10/2012 | Jennas, II et al. |
| 2012/0272030 | A1 | 10/2012 | Jennas, II et al. |

FOREIGN PATENT DOCUMENTS

| EP | 1840723 A2 | 10/2007 |
| JP | 2008015984 A | 1/2008 |
| JP | 2008197779 A | 8/2008 |

\* cited by examiner

*Primary Examiner* — Ryan Bertram
(74) *Attorney, Agent, or Firm* — Griffiths & Seaton PLLC

(57) ABSTRACT

Extent migration is provided in a data storage environment configured for synchronous replication between a primary and secondary pair of storage entities, each having tiered storage devices. In one embodiment, by way of example only, a migration instruction is sent, by the primary storage entity, to the secondary storage entity, the migration instruction including a time delta approximately equal to a time of an intended migration at the primary storage entity adjusted for a transmission time such that the primary and secondary storage entities conduct the extent migration at approximately a same time.

14 Claims, 3 Drawing Sheets

SYNCHRONOUS EXTENT MIGRATION PROTOCOL FOR PAIRED STORAGE

BACKGROUND OF THE INVENTION

1. Field of the Invention

The present invention relates in general to computers, and more particularly to apparatus and computer program product embodiments for extent migration, in a data storage environment configured for synchronous replication between a primary and secondary pair of storage entities, each having tiered storage devices, extent migration.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures, as described above, include a variety of storage mediums. These may include such media as enterprise hard disk drives (HDD), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

In a pair of tiered storage systems (e.g., primary and secondary) having a synchronous mirroring relationship, for example, the storage systems cannot take full advantage of data migration functionality because, at least in part, the secondary system does not receive host input/output (I/O). The profiling algorithms generally used in the primary system to determine which data should be migrated cannot be used accurately on the secondary system. As a result, performance and efficiency of the entire storage environment may be negatively affected. A need exists for a mechanism whereby such storage entities may migrate data on each entity, respectively, at approximately the same time.

Accordingly, and in view of the foregoing, various system, method, and computer program product embodiments for extent (i.e., data segment) migration in a data storage environment configured for synchronous replication between a primary and secondary pair of storage entities, each having tiered storage devices, are provided. In one embodiment, by way of example only, a migration instruction is sent, by the primary storage entity, to the secondary storage entity, the migration instruction including a time delta approximately equal to a time of an intended migration at the primary storage entity adjusted for a transmission time such that the primary and secondary storage entities conduct the extent migration at approximately a same time.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, tiered storage systems configured in a synchronous mirroring relationship are not currently configured to take full advantage of extent migration functionality because the secondary storage system doesn't receive host input/output (I/O). I/O is instead received from the primary storage system. Again as previously mentioned, as a result, the profiling algorithms to determine which data segments should be migrated cannot be performed accurately on the secondary system because the secondary system only receives write I/O operations. When the primary system determines to move an extent, the secondary system may not know to move the extent. Consider the following example. As the secondary machine still has the extent on a lower tier, and as writes need to complete on both the primary and the secondary systems prior to sending a completion status back to the host, the write performance is still the write performance of the lower tier, even though the primary system subsequently moved the extent to a higher tier.

In addition, in the event that the host fails over to the secondary system, current methodologies require the secondary system to "learn" which data segments are extensively used and which are not (i.e., "hot" and "cold" data segments), and move the data segments accordingly. This learning process expends time and resources, during which time performance is degraded.

The illustrated embodiments provide mechanisms for efficient extent migration functionality between tiered storage in a storage environment configured in a synchronous mirroring relationship. As will be further described, these mechanisms, in one aspect, implement a migration instruction that is sent between the primary and secondary storage systems. The migration instruction is a data structure that may be adapted with several fields, as will be further described. In one of such fields, a time delta is included. This calculation allows the secondary storage system to ascertain the correct time to migrate a particular extent such that both the primary and secondary storage systems migrate the extent at approximately the same time. Additional aspects and advantages will be further described, following.

Figure 1:
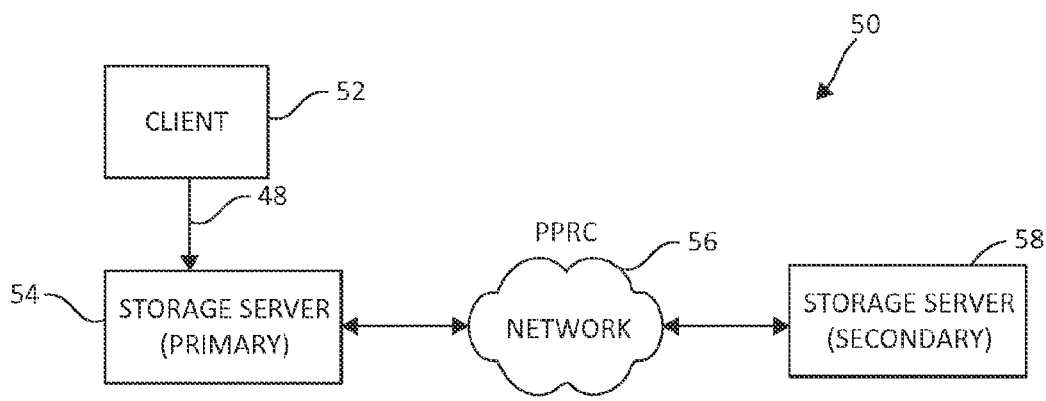
FIG. 1 is a block diagram illustration of an exemplary computing storage environment in accordance with certain embodiments.

FIG. 1 is a block diagram illustration of an exemplary storage system 50 configured in a synchronous mirroring relationship (such as an IBM® TotalStorage® PPRC system). A primary storage server 54 receives input/output (I/O) from one or more clients 52 as shown. The storage server 54 is connected through a network 56 to a remote, secondary storage server 58.

As an exemplary synchronous mirroring function, PPRC is a function that continuously updates a secondary (target) copy of a storage volume to match changes made to a primary (source) volume (such as an ESS storage disk). Any pair of equal-sized volumes can be configured for a PPRC relationship, during which all write operations performed on the source are synchronously mirrored to the target device. The PPRC protocol guarantees that the secondary copy is constantly up-to-date by ensuring that the primary copy is written only if the primary storage subsystem received acknowledgement that the secondary copy has been written. The paired volumes typically reside on two distinct and geographically separated ESS devices communicating over ESCON® or over a fiber channel link.

Figure 2:
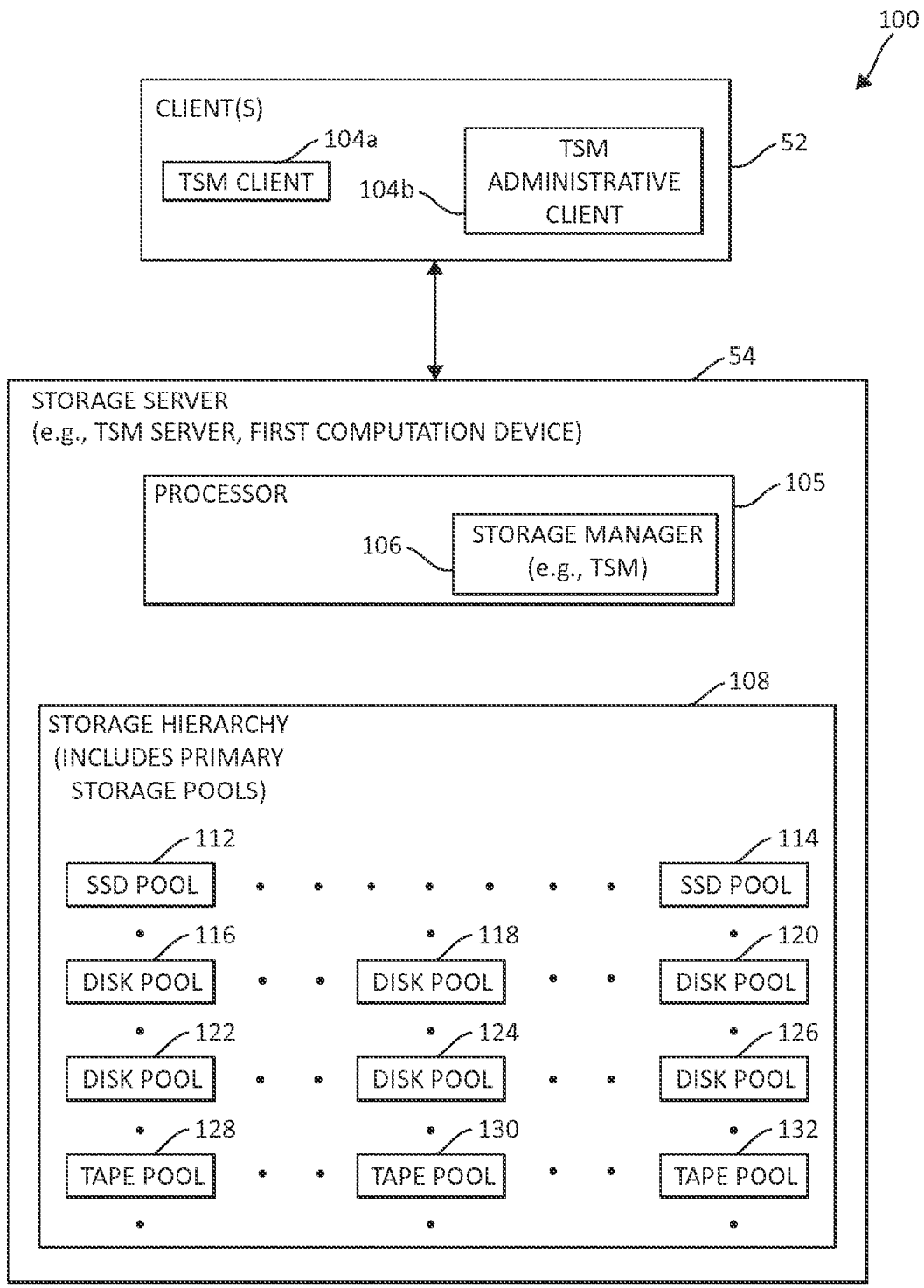
FIG. 2 is a block diagram illustration of an exemplary storage hierarchy in a storage server.

Turning now to FIG. 2, a block diagram of a computing storage environment 100 in accordance with certain embodiments is illustrated. The computing storage environment 100 includes a first computational device, such as storage server 54 as illustrated previously, coupled to one or more computational devices, such as clients 52. In certain embodiments, the storage server 54 and the clients 52 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as IBM® Tivoli® Storage Manager® (TSM), may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a. The storage manager 106 and/or processor device 105 may allow a system administrator to configure storage pools, where a storage pool comprises a group of devices used for storing data received from the TSM client 104a. Storage pools are used as targets for store operations from the TSM client 104a and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric including write or read speeds. The storage hierarchy 108 as shown may be organized such that the top of the hierarchy may include a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114).

Below the SSD pools 112 and 114, a first tier of disk pools (e.g., disk pools 116, 118, and 120) may be then organized. As one of ordinary skill in the art will appreciate, disk pools 116, 118, and 120 may include a variety of disk devices such as pools of enterprise disk drives, SATA disk drives, disk devices configured in a particular redundant array of independent disks (RAID) configuration, and the like.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism.

The illustrated embodiments provide mechanisms for efficient placement of appropriate data in the SSD pools 112 and 114, and thereby overall placement of data between storage mediums such as that found in the storage hierarchy 108. In one embodiment including a tier of disk pools corresponding to a number of SSD devices, the storage server 54 performs I/O profiling activity on particular data segments by examining such statistical information such as the aforementioned read/write ratio. Those data segments having a higher read-to-write ratio (e.g., less writes) are better candidates for SSD storage than those data segments having a lower read-to-write ratio (e.g., more writes).

Each data segment in a candidate group (such as those in a particular volume or group of volumes, pool, tier of pools, or similar group) may be first analyzed to determine if the particular data segment has been repetitively accessed. If this is the case, the particular data segment is thought to be a good candidate for SSD storage, as its particular I/O profile demonstrates that the data segment is in demand, and that overall performance of the computing environment would benefit if the latency of this particular data segment were reduced.

If a particular data segment is identified as described above, it may then be added to a "hot" list of data segments. The hot list of data segments may then be iterated, and for a given extent, the read/write ratio is examined. If the read/write ratio is determined to be greater than a predefined threshold, the hot data segment is added to an additional list of "ratio" data segments that are identified as having a higher read/write ratio.

Figure 3A:
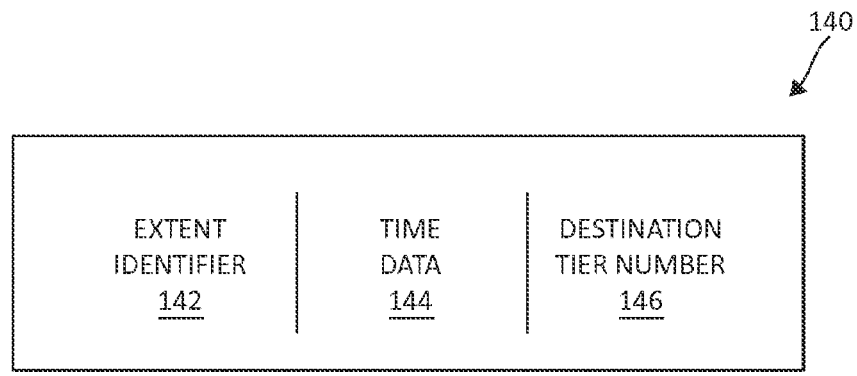
FIG. 3A is a block diagram illustration of an exemplary migration instruction data structure.

Turning to FIG. 3A, an exemplary data structure configured as a migration instruction 140, for implementing various aspects of the illustrated embodiments, is shown. Migration instruction 140 is sent from the primary storage system to the secondary storage system as will be further described. In the illustrated embodiment, the migration instruction 140 is configured with an extent identifier field 142, a time delta field 144, and a destination tier number field 146 as shown. Extent identifier field 142, in one embodiment, is a unique identifier that identifies the data segment (here an extent) to be moved. Time delta field 144 identifies the applicable time delta when the secondary system should move the data segment, as will be further described. Destination tier number 146, in one embodiment, identifies the applicable tier the primary storage system plans on moving the data segment to.

Figure 3B:
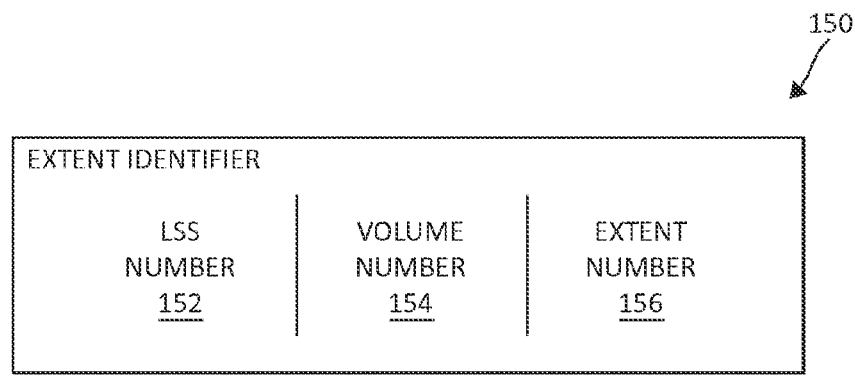
FIG. 3B is a block diagram illustration of an exemplary extent identifier data structure.

FIG. 3B illustrates an exemplary data structure configured as an extent identifier 150, again for implementing various aspects of the illustrated embodiments. In the illustrated embodiment, extent identifier 150 is configured with three parameters to identify a particular extent. First, the logical storage subsystem (LSS) number for the particular extent is included. Next, the applicable volume number 154 for the particular extent is included. Finally, an applicable extent number 156 in the volume is included, as shown.

Consider the following example of a volume A, having extents 0 to 0xFFFF (hexadecimal). The primary storage system determines that an extent 1 in volume 1 in LSS 1 should be migrated (for example, the extent is determined to be a hot extent). Accordingly, the extent identifier sent to the secondary follows as 0x1|0x1|0x1.

Figure 4:
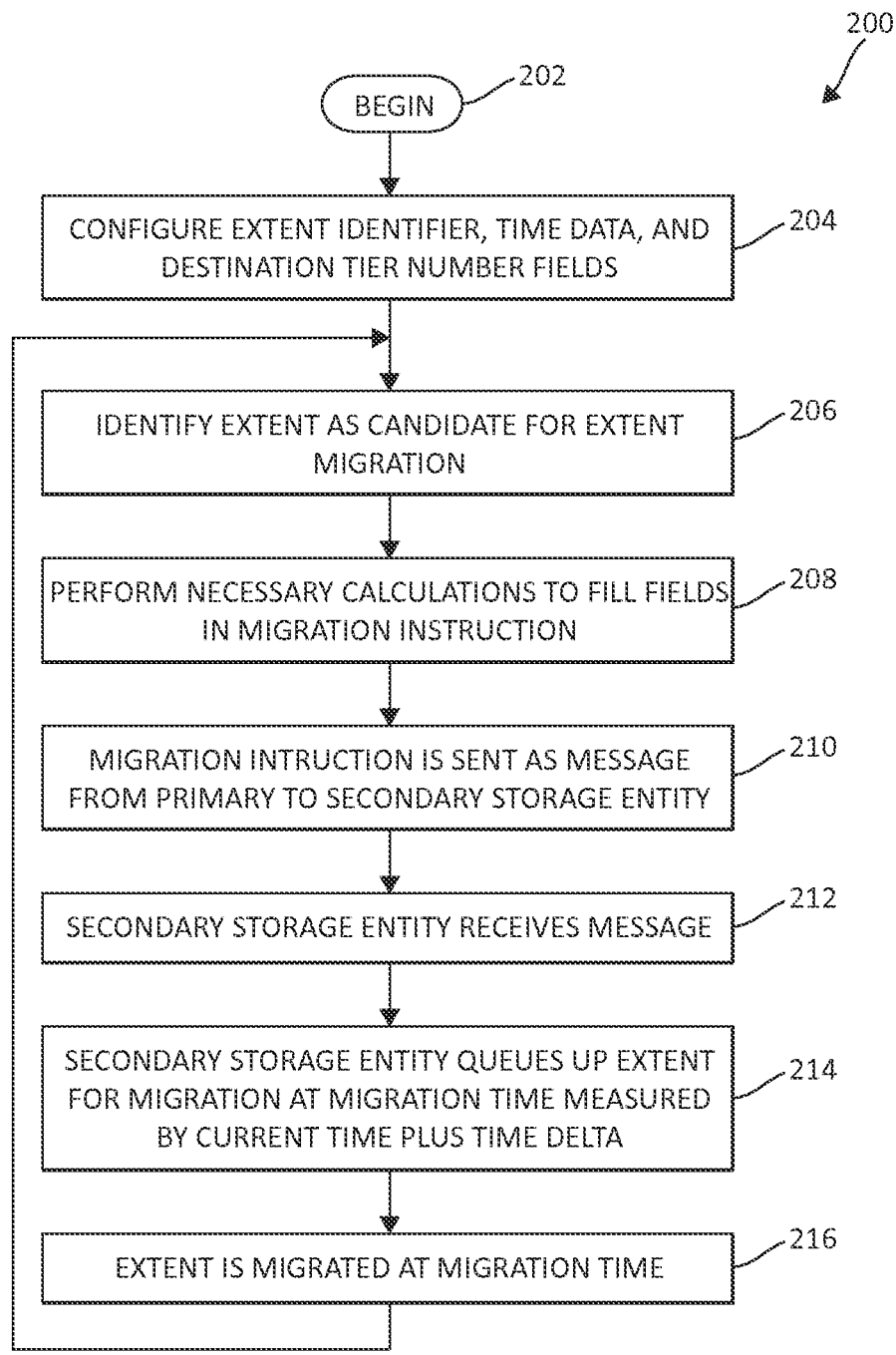
FIG. 4 is a flow chart illustration of an exemplary method for extent migration in a storage environment having a pair of synchronously mirrored storage entities, in which various aspects of the illustrated embodiments may be implemented.

Turning now to FIG. 4, following, a flow chart illustration of an exemplary method 200 for extent migration functionality in a storage system configured with pairs of synchronously mirrored storage entities, in which various aspects of the illustrated embodiments may be implemented. As one of ordinary skill in the art will appreciate, various steps in the method 200 may be implemented in differing ways to suit a particular application. In addition, the described method 200 may be implemented by various means, such as hardware, software, firmware, or a combination thereof operational on or otherwise associated with the computing storage environment. For example, the methods 200 may be implemented, partially or wholly, as a computer program product including a computer-readable storage medium having computer-readable program code portions stored therein. The computer-readable storage medium may include disk drives (including SSD devices), flash memory, digital versatile disks (DVDs), compact disks (CDs), and other types of storage mediums.

Method 200 begins (step 202) by configuring a migration instruction with an extent identifier, time delta, and destination tier number fields (step 204). At a subsequent time, a particular extent is identified as a candidate for extent migration (step 206). This identification may be obtained through analysis of various storage characteristics and factors associated with the extent as previously described, such as read/write ratios, and the like. Once an extent migration candidate is selected, the necessary calcualtions to fill each of the previously configured extent identifier, time delta, and destination tier number fields are made (step 208). Once these fields are filled, the data structure is sent sm the primary storage system to the secondary storage system as a migration instruction (step 210). The secondary storage system receives the migration instruction message (step 212), and accordingly queues up the extent for migration at a migration time measured by the storage system's current time plus the time delta (step 214). As the migration time approaches, the extent is then migrated on the secondary storage system, at a time approximately equal to when the mirrored extent is migrated on the primary storage system (step 216). The method 200 then returns to step 206, where, at a subsequent time, the primary storage system again identifies a new extent as a migration candidate.

As one of ordinary skill in the art will appreciate, the method 200 may be additionally performed on a scheduled interval in lieu of the storage request previously described. The scheduling may occur pursuant to various implementations of the computing storage environment. For example, the scheduling may coincide with periods of high and/or low storage activity. The scheduling may be configured by a system administrator using the storage manager 106 (FIG. 1) or by other similar means.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for, in a data storage environment configured for synchronous replication between a primary and secondary pair of storage entities, each having tiered storage devices, a method for extent migration, comprising:
   at least one storage management module, operable in the data storage environment, wherein the at least one storage management module is adapted for:
      sending, by the primary storage entity, a migration instruction to the secondary storage entity, the migration instruction including a time delta approximately equal to a time of an intended migration at the primary storage entity adjusted for a transmission time such that the primary and secondary storage entities conduct the extent migration at approximately a same time.

2. The system of claim 1, wherein the at least one storage management module is further adapted for, by at least a storage activity factor, identifying an extent as a candidate for the extent migration.

3. The system of claim 1, wherein the at least one storage management module is further adapted for configuring the migration instruction with at least one of an extent identifier field, a time delta field, in which the time delta is incorporated, and a destination tier number field.

4. The system of claim 3, wherein the at least one storage management module is further adapted for performing at least one calculation to obtain at least one of an extent identifier value, the time delta, and a destination tier number for insertion into the migration instruction.

5. The system of claim 1, wherein the at least one storage management module is further adapted for, upon receipt of the migration instruction by the secondary storage entity, queueing an extent to be migrated pursuant to the extent migration at a migration time calculated as a current time plus the time delta.

6. The system of claim 5, wherein the at least one storage management module is further adapted for migrating the extent at the migration time.

7. The system of claim 1, wherein the at least one storage management module is operable as a storage management processor (SMP) device.

8. The system of claim 1, wherein the primary and secondary storage entities include at least one of a tape tier, a enterprise drive tier, a solid state drive (SSD) tier, and a cache tier for conducting the extent migration therebetween.

9. A computer program product for, in a data storage environment configured for synchronous replication between a primary and secondary pair of storage entities, each having tiered storage devices, extent migration by a processor device, the computer program product comprising a non-transitory computer-readable storage medium having computer-readable program code portions stored therein, the computer-readable program code portions comprising:
   a first executable portion for sending, by the primary storage entity, a migration instruction to the secondary storage entity, the migration instruction including a time delta approximately equal to a time of an intended migration at the primary storage entity adjusted for a transmission time such that the primary and secondary storage entities conduct the extent migration at approximately a same time.

10. The computer program product of claim 9, further including a second executable portion for, by at least a storage activity factor, identifying an extent as a candidate for the extent migration.

11. The computer program product of claim 9, further including a second executable portion for configuring the migration instruction with at least one of an extent identifier field, a time delta field, in which the time delta is incorporated, and a destination tier number field.

12. The computer program product of claim 11, further including a third executable portion for performing at least one calculation to obtain at least one of an extent identifier value, the time delta, and a destination tier number for insertion into the migration instruction.

13. The computer program product of claim 9, further including a second executable portion for, upon receipt of the migration instruction by the secondary storage entity, queueing an extent to be migrated pursuant to the extent migration at a migration time calculated as a current time plus the time delta.

14. The computer program product of claim 13, further including a third executable portion for migrating the extent at the migration time.

* * * * *